United States Patent

Adell

[11] 4,271,633
[45] Jun. 9, 1981

[54] MOLDING FOR VEHICLE DOOR EDGES

[75] Inventor: Robert Adell, Bloomfield Hills, Mich.

[73] Assignee: U.S. Product Development Company, Novi, Mich.

[21] Appl. No.: 21,085

[22] Filed: Mar. 16, 1979

Related U.S. Application Data

[63] Continuation of Ser. No. 863,997, Dec. 23, 1977, abandoned.

[51] Int. Cl.³ .............................................. E04F 19/02
[52] U.S. Cl. ........................................ 49/462; 52/716; 52/823
[58] Field of Search .................... 52/400, 716, 823; 49/462

[56] References Cited

U.S. PATENT DOCUMENTS

| | | | |
|---|---|---|---|
| 1,082,031 | 12/1913 | Lee | 52/823 X |
| 2,692,664 | 10/1954 | Ternes | 52/829 X |
| 2,704,687 | 3/1955 | Adell | 49/462 |
| 2,704,688 | 3/1955 | Adell | 49/462 |
| 2,856,229 | 10/1958 | Adell | 49/462 |
| 3,214,212 | 10/1965 | Horton | 49/391 |
| 3,340,224 | 9/1967 | Sherman et al. | 52/400 X |
| 3,401,486 | 9/1968 | Adell | 52/823 X |
| 3,494,075 | 2/1970 | Kunevicius | 49/462 |
| 3,545,157 | 12/1970 | Cziptschirsch | 49/462 X |

*Primary Examiner*—Alfred C. Perham

[57] ABSTRACT

An ornamental and protective molding for the edges of vehicle doors in which a U-shaped metal strip is formed with beads acting as guides to facilitate installation of the molding on vehicle doors without scratching the painted surfaces with the beads acting as clamping surfaces for retaining the molding on the door. The outer leg of the strip has a single thickness of material and the inner leg a double thickness, and an insulating liner nests within the strip to insulate it from the door edge.

4 Claims, 5 Drawing Figures

MOLDING FOR VEHICLE DOOR EDGES

This is a continuation of application Ser. No. 863,997 filed Dec. 23, 1977, now abandoned.

This invention relates to moldings for use on automotive vehicles or the like and more particularly to ornamental and protective moldings to be mounted on the edge of vehicle doors.

Strips of molding are applied to the marginal edges of vehicle doors for ornamental and protective purposes. Typically such moldings are made of metal and are U-shaped in cross section to rely on the resiliency of the molding to grip opposed surfaces at the hem or marginal edge of the door. The edges of the door are thin when compared with the balance of the door and usually include a layer of metal folded around the edge of another layer of metal so that three layers of material result. A plastic sealant material is applied between the layers of metal which is subsequently dried and hardened. Also the outer surfaces are painted. As a result of the various layers of metal, sealant and paint, the thickness of the door edge has relatively wide variations in dimensions. It is on this door edge that it is customary to install ornamental and protective moldings. In making such an installation it is necessary to use a molding which can accommodate all of the dimensional variances. To do so the molding must have an opening not much smaller than the smallest thickness of the door edge. Thereafter, when the molding is applied to the edge of the door, it is forced into position and in so doing the molding may be distorted excessively so that it loses some of its ability to be retained in position. Also forcing the molding into position may cause scratching of the paint, particularly at high spots or thick portions of the door edge. Such scratches can encourage the formation of rust and initiate corrosion which are conditions that can become particularly aggravated in the presence of moisture. When the metals used in the door and in the trim molding are dissimilar, electrochemical reactions can occur which accelerate corrosion.

It is highly desirable and is an object of the invention to provide a molding for the edges of doors which can accommodate wide variations in door thickness and can be applied to the door without scratching the surfaces.

Another object of the invention is to provide a molding for door edges wherein the molding grips opposed surfaces of the door to hold the molding in position.

The objects of this invention are accomplished by providing a molding for the trailing edges of vehicle doors in which the molding is in the form of an elongated strip of relatively hard material such as metal and has a generally U-shaped cross section with bead portions at opposite edges of the opening formed by the legs of the U. The beads act as the primary points applying pressure to opposed surfaces of the door to hold the trim molding in position. The bight portion maintaining the legs in spaced apart relationship to each other acts as a stop which engages the trailing edge or end of the door to limit and establish the position of the molding relative to the door. The intermediate portions of the legs between the bead and the bight portion are spaced apart from opposed surfaces of the door a distance at least equal to the maximum door thickness that is expected to be encountered. In one embodiment of the invention one of the legs is formed by bending the material inwardly to extend adjacent to the inner surface of the leg the full distance between the bead and the bight portion. A bead at the free end of each leg forms a smooth guide or cam surface which facilitates applying the molding to the edge of the door so that the molding slides thereon without marring or scratching the painted surfaces to avoid ultimate rust and corrosion problems.

These and other objects of the invention will become apparent from the following description and from the drawings in which.

Figure 1:
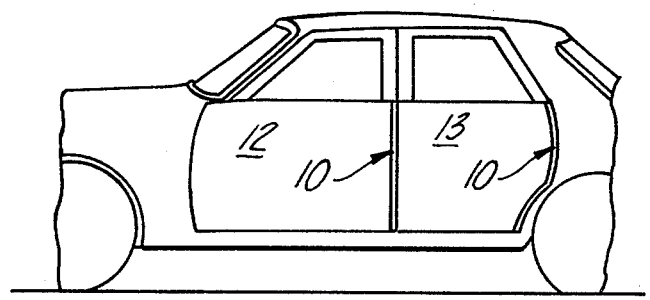
FIG. 1 is a fragmentary elevational view of a motor vehicle showing ornamental and protective molding embodying the present invention applied at the trailing edge of the vehicle doors.
Figure 2:
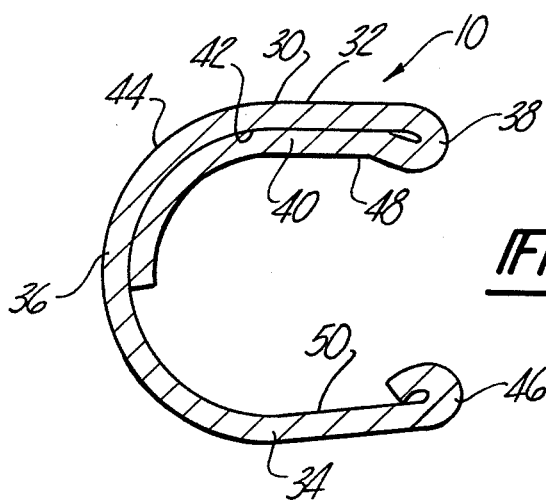
FIG. 2 is a cross sectional view of the molding at an enlarged scale and separate from the vehicle.
Figure 3:
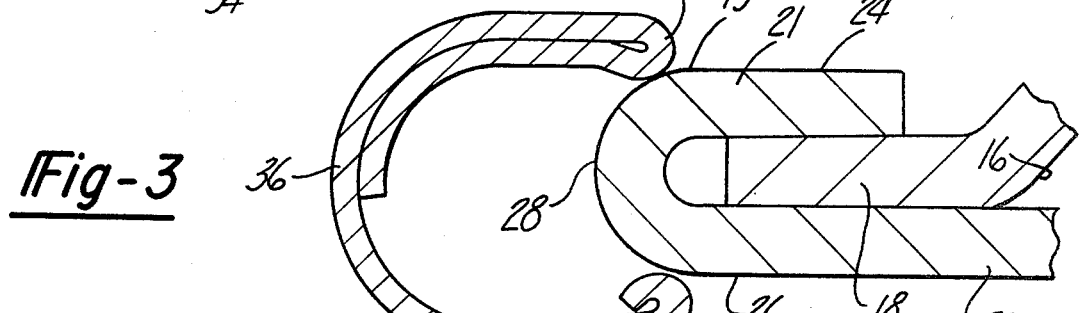
FIG. 3 is a view similar to FIG. 2 showing the molding in position for installation on the edge of a vehicle door.

The ornamental and protective molding embodying the present invention is designated generally at 10 and is shown in FIG. 1 applied to the trailing edges of doors 12 and 13 of an automotive vehicle. As seen in FIG. 3, the door edge 15 to which the molding is applied includes an inner door sheet 16 made of metal and bent to provide a flange 18 and an outer door sheet 20 having an edge portion 21 bent and folded around the flange 18 to form a marginal door edge having an oppositely facing inner surface 24 and an outer surface 26 with the trailing edge 28 being curved.

During the formation of the door, a sealant material is applied between the various layers of metal making up the door and subsequently portion 21 is spot welded to flange 18. Thereafter the door is painted and the paint and sealant are dried to a hardened condition. Because of the multiple layers and particularly because of the layers of sealant and paint which are very variable in thickness, the total thickness of the door edge 15 can vary substantially over the full length of the trailing edge on which the molding 10 is to be applied. In actual practice on some models of automotive vehicles, doors constructed in this manner actually vary in dimension from a thickness of 0.110 to 0.160 inches and the molding 10 which is applied to these edges must accommodate these substantial variations.

The molding 10 includes a strip 30 of resilient metal such as stainless steel, for example, which is bent to form an elongated channel having a generally U-shaped cross section with an inner leg 32 and an outer leg 34 joined together by a curved bight portion 36. The legs 32 and 34 are slightly bowed so that the legs and the bight portion have a generally overall elliptical shape. The free end of the leg 32 is formed by bending the edge of the strip of metal inwardly upon itself to form a bead 38 with a layer of material 40 in engagement with the inner surface 42 of the outer layer 44 of material. The inner layer 40 extends for substantially the full length of the leg 32 and into the bight portion 36. The bead 38 forms an eye in which the layers of material 40 and 44 are not in engagement with each other.

The free end of the outer leg 34 is formed with a bead 46 in which the metal of the outer layer 44 is bent inwardly so that the end comes into engagement with the inner surface of the layer 44 but so that the bead is generally tubular and open.

The beads 38 and 46 of the molding 10 are disposed in opposed relationship to each other and form an opening to receive the door edge. The spacing of the beads 38 and 46 is such that the dimension is slightly less than the minimum door dimension that is expected to be encountered so that the resiliency of the metal tends to clamp the beads 38 and 46 together to hold the molding in position on the door. The intermediate portion of the legs 32 and 34 have surfaces 48 and 50, respectively, which are spaced apart a distance substantially equal to the largest variation in dimension that is expected to be encountered.

When the molding strip is to be applied to the edge 15 of a door, the parts are placed relative to each other as best seen in FIG. 3 so that the gap between the surfaces of the beads 38 and 46 receives the rounded edge 28 of the door edge 15. Subsequently the molding is pushed onto the door edge 15 during which time the rounded beads 38 and 46 act as guides or cams which spread the legs 32 and 34 and facilitate slipping of the molding 10 relative to the door so that the molding does not scratch the paint on the door. The molding 10 is forced into position until the end of the inner layer 40 adjacent to the bight portion 36 engages the edge 28. This acts as a stop and limits further movement of the molding onto the door lip or edge 15.

With the molding 10 in position and with the beads 38 and 46 engaging opposed and oppositely facing surfaces 24 and 26 of the door edge 15. The double thickness of material in the inner leg forms a relatively stiff, strong wall holding the bead 38 in position relative to the inner surface 24 of the door edge 15. The outer leg 34 is formed of a single layer of material and is relatively flexible to urge the bead 46 into clamping engagement with the outer surface 26 of the door edge 15. With door edges of the type mentioned previously ranging in thickness from 0.110 to 0.160 inches, the gap between the beads is preferably slightly less than 0.110 inches whereas the distance between the mid-portions of the legs 32 and 34 is approximately 0.160 inches, the maximum dimension intended to be encountered.

Figure 4:
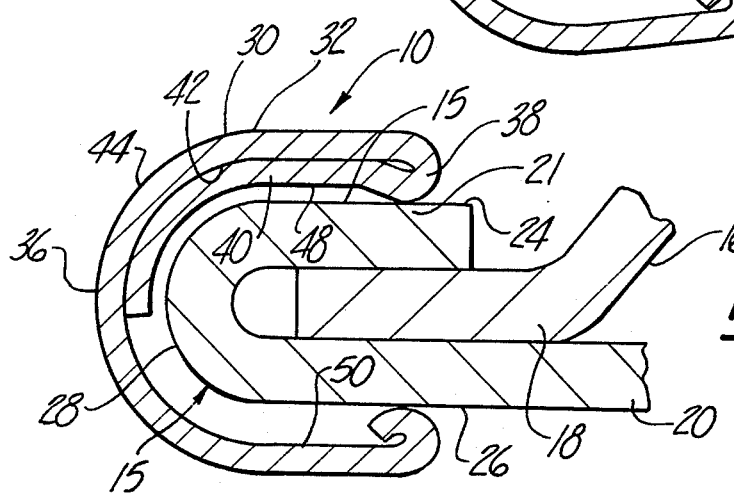
FIG. 4 is a view similar to FIG. 3 showing the molding near its fully installed position on the edge of the door.
Figure 5:
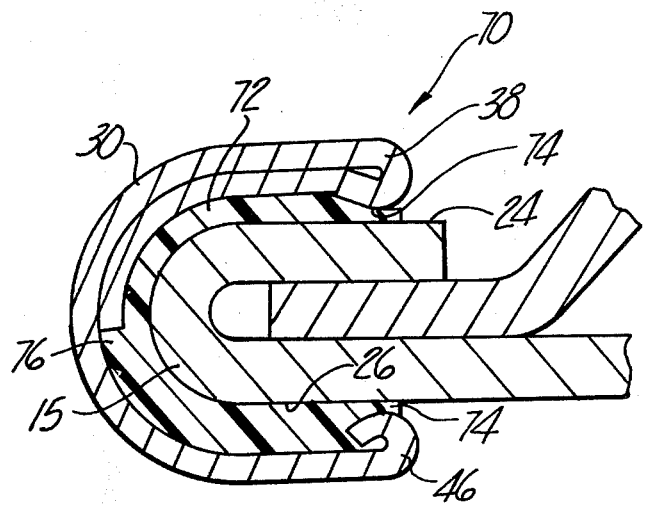
FIG. 5 is a view of a modification of the embodiment shown in FIG. 4.

A modified molding 70 is shown in FIG. 5, which is similar to the molding 10 seen in FIG. 4 except that the metal strip or channel 30 is provided with a plastic lining 72. The lining 72 is extruded through dies giving it a configuration conforming substantially to the space within the U-shaped outer metal member 30 and the door edge 15. The plastic lining 72 has relatively thin edge portions 74 which maintain the beads 38 and 46 in slightly spaced relationship to the surfaces 24 and 26 of the door edge 15.

The metal strip 30 is formed so that the completed molding 70 has a spacing between the end portions 74 which is slightly smaller than the minimum door dimension that is expected to be encountered. When the molding 70 is applied to the edge 15 of the door, the molding 70 is forced into position during which time the relatively soft plastic material forming the lining 72 and more particularly the end portions 74 engage the outer surfaces 24 and 26 of the door edge so that the metal portion does not come in contact with a door. During mounting operations the plastic lining 72 facilitates sliding of the molding 70 relative to the door and avoids scratching the paint on the door. Also the bight portion 76 of the plastic lining 72 acts as a stop limiting the movement of the molding 70 relative to the door to cushion the molding 70 from the hard surface of the door. With the molding installed the beads 38 and 46 act to clamp the molding 70 in position and the pressure applied by the beads on the plastic portion 74 act as a seal against dirt and moisture which otherwise might enter between adjoining surfaces of the door molding 70 and the surfaces of the doors 12 and 13. The plastic lining also acts to insulate the metal strip 30 from the metal of the door. When the door and molding are made of dissimilar metals such as aluminum and steel such insulation is significant in preventing electrolysis and corrosion. In other respects, the metal strip 30 is the molding 70 performs in the same manner as the molding 10.

The lining 72 is preferably an extruded plastic, but other materials may be substituted. Other materials such as plastic foam, gasket type materials or soft metal foils are available in commercial form as tapes with adhesive on one or both sides. With tape material having adhesive on one or both sides, one side acts to bond the lining to the metal member 30 and the other layer of adhesive facilitates securing the molding to the door. When the lining material is in the form of a metal foil and particularly when the foil has adhesive on both of its surfaces, the layers of adhesive assists in insulating the foil of the lining from the metal strip 30 and from the surfaces of the door edge 15 while the stronger foil portion, which is softer than the metal strip 30, prevents the latter from damaging or scratching the painted surfaces of the door edge 15 thereby preventing the beginnings of rusting.

An ornamental and protective molding for the edges of vehicle doors have been provided in which an elongated strip of relatively hard material such as metal is formed in a generally U-shaped cross section with beaded edges at the ends of the legs of the U. The beads act as cams or guides during installation of the molding on the trailing edge of a door of a vehicle. Intermediate portions of legs are spaced apart a distance substantially equal to the maximum dimension that is expected to be encountered and the beads are spaced apart a distance slightly less than the expected minimum thickness of the door edge. In one embodiment of the invention one of the legs is relatively stiff and the other leg is relatively resilient to apply a clamping force to the door edge holding it in position. In a modification a plastic liner is added to form a seal against moisture and dirt and also acts as an insulator between the metals of the molding and the door to prevent electrolysis and corrosion.

The embodiments of the invention in which an exclusive property or privilege is claimed are defined as follows:

1. For a vehicle body having a sheet metal closure, such as a door, on a marginal edge of which an ornamental and protective metallic edge molding is adapted to be disposed, said molding being formed from a strip of resilient metal to form a generally U-shaped cross section having two side legs and a bottom, the thickness of which correspond to the thickness of the strip material, the improvement in said molding characterized in that there is provided an excess of material along one edge of the strip which is folded back against and along the length of one of the two side legs of the U to thereby increase the stiffness of that side of the U relative to the other side of the U.

2. The improvement of claim 1 wherein the excess material which is folded back against and along the length of one of the two side legs of the U extends the full length of said one side leg and also against and at least partially along the bottom of the U.

3. The improvement of claim 1 further including a strip of insulating material softer than the material of the molding and of generally U-shaped cross section nesting within the molding and having side legs which extend essentially the full length of the side legs of the molding.

4. The improvement of claim 3 wherein beads are provided along the free edges of the side legs of the molding coacting with the insulating material whereby the latter is retained in nested relationship with the former.

* * * * *